May 15, 1956 G. A. BOETTCHER 2,745,494
JACQUARD CARD DUPLICATING MACHINE
Filed March 7, 1952 8 Sheets-Sheet 1

INVENTOR:
GUSTAV A. BOETTCHER
BY C.F.Wm.Forssberg
ATTORNEY

May 15, 1956 G. A. BOETTCHER 2,745,494
JACQUARD CARD DUPLICATING MACHINE
Filed March 7, 1952 8 Sheets-Sheet 2

INVENTOR:
GUSTAV A. BOETTCHER
BY C. F. Wm. Forssberg
ATTORNEY.

May 15, 1956 G. A. BOETTCHER 2,745,494
JACQUARD CARD DUPLICATING MACHINE
Filed March 7, 1952 8 Sheets-Sheet 3
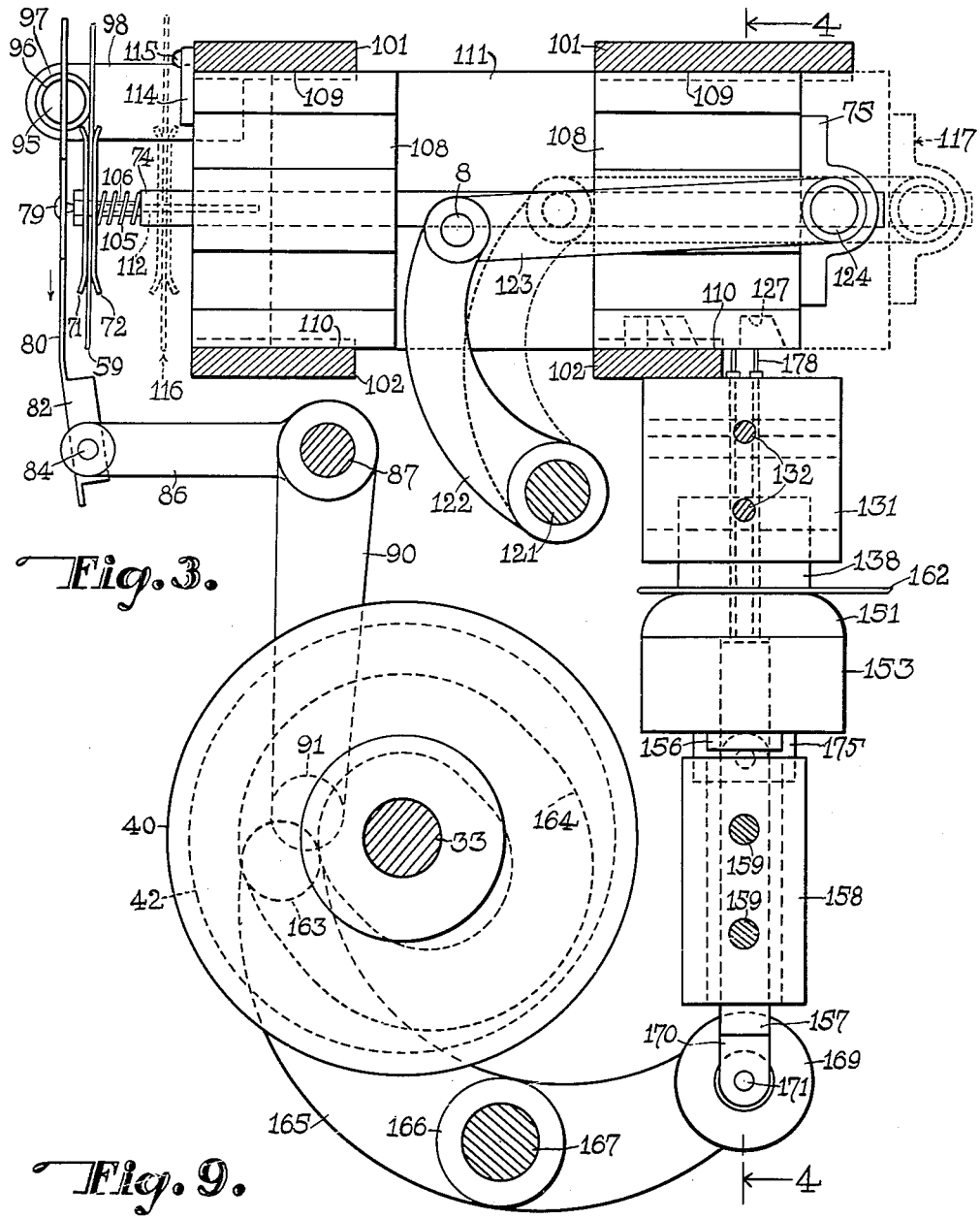
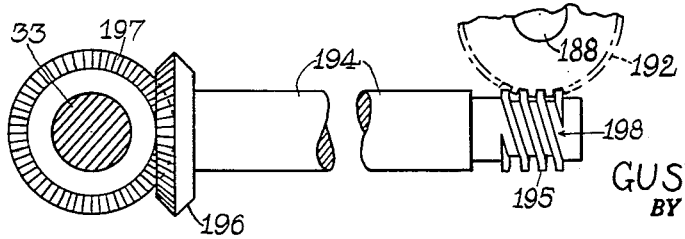
INVENTOR:
GUSTAV A. BOETTCHER
BY
C. F. Wm. Forssberg.
ATTORNEY.

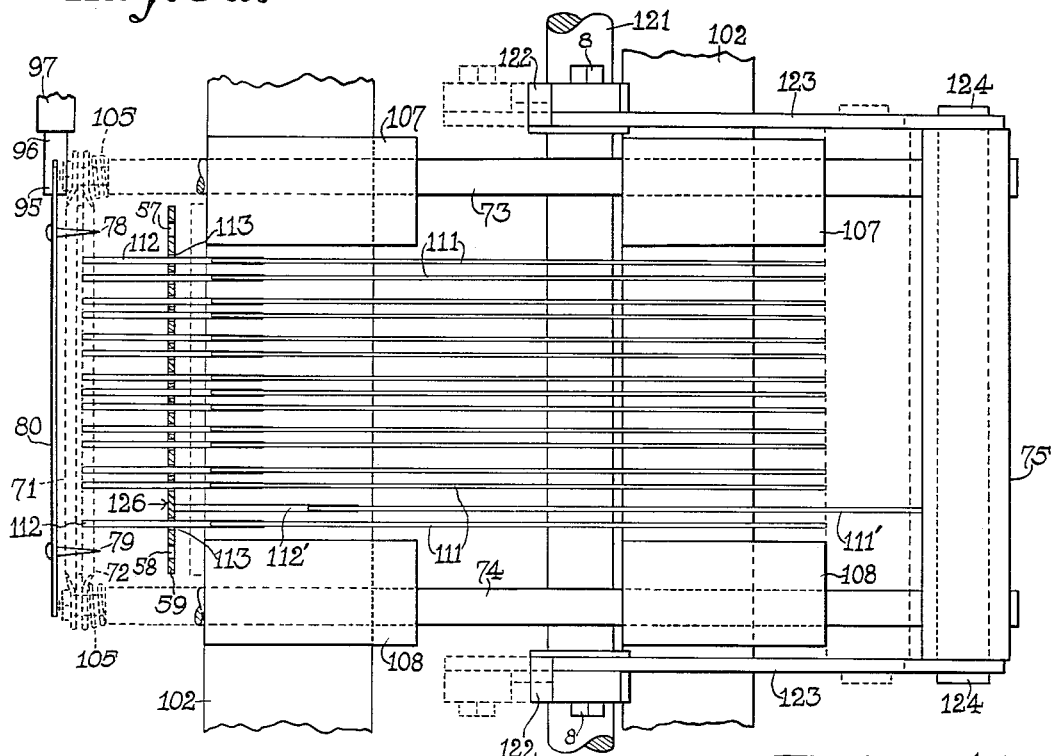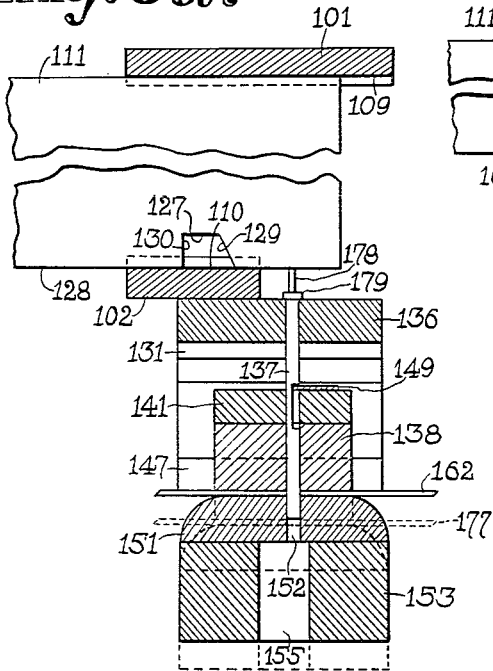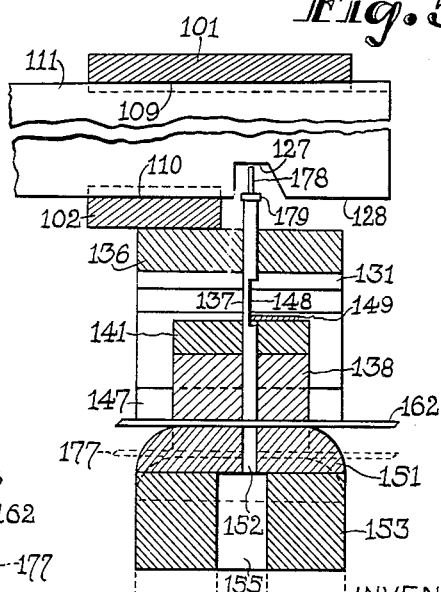

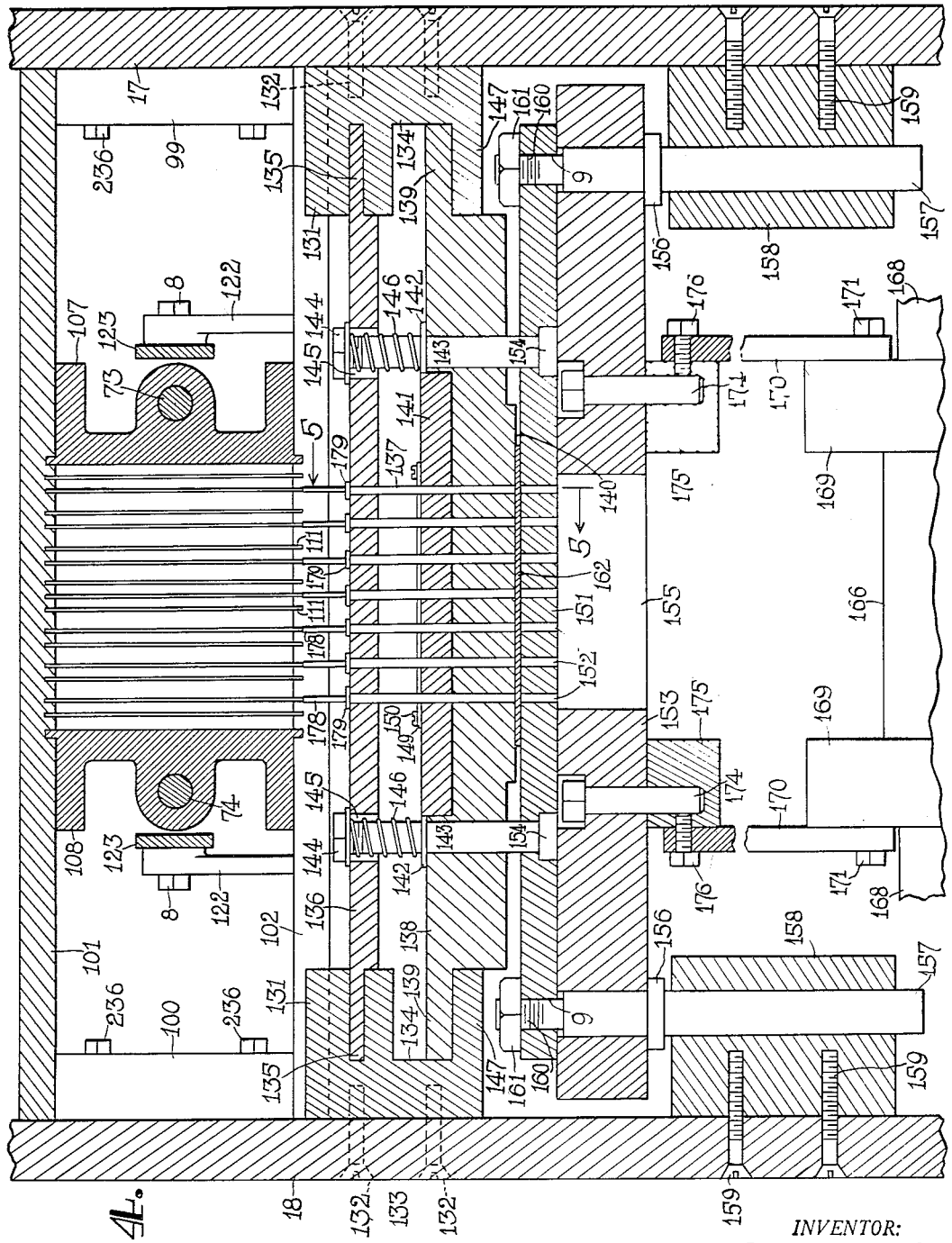

May 15, 1956 G. A. BOETTCHER 2,745,494
JACQUARD CARD DUPLICATING MACHINE
Filed March 7, 1952 8 Sheets-Sheet 6

INVENTOR:
GUSTAV A. BOETTCHER
BY C. F. Wm. Forssberg
ATTORNEY.

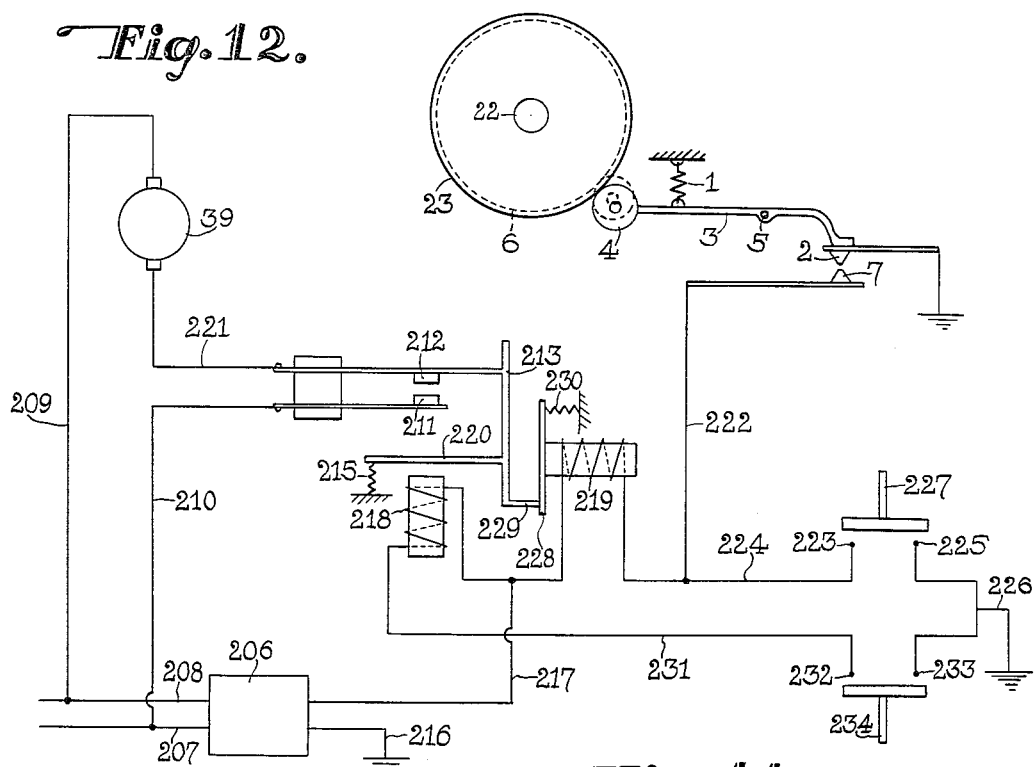
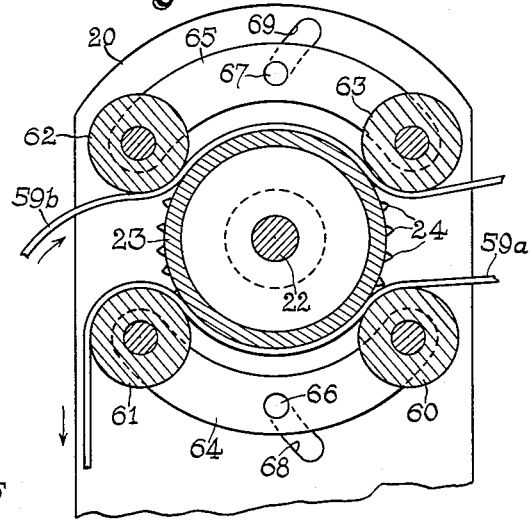

May 15, 1956  G. A. BOETTCHER  2,745,494
JACQUARD CARD DUPLICATING MACHINE
Filed March 7, 1952  8 Sheets-Sheet 8

INVENTOR:
GUSTAV A. BOETTCHER
BY C. F. Wm. Forssberg
ATTORNEY.

United States Patent Office 2,745,494
Patented May 15, 1956

2,745,494

JACQUARD CARD DUPLICATING MACHINE

Gustav A. Boettcher, New York, N. Y.

Application March 7, 1952, Serial No. 275,347

8 Claims. (Cl. 164—114)

This invention relates to card repeating machines and the like, and particularly to a Jacquard card duplicating machine.

The main object of my invention is to provide virtually infallible mechanical means for rapidly and faithfully duplicating chains or continuous strips of Jacquard cards of any extent or length that are so completely accurate and reliable that subsequent checking or correction will be entirely superfluous and thus eliminated.

Another object of the invention is to have such a card duplicating machine that is adapted to have a master Jacquard card and also a corresponding copy card mounted for simultaneous feeding movements upon the machine, and to reproduce the perforations step by step of the master card upon the copy card.

An ancillary object is to have a duplicating machine of the character indicated which carries and feeds the master Jacquard card upon and through one section of the machine, while perforating and feeding the copy card through another section of the same machine, and which despite its varied functions is very compact as a whole.

An important object is to have such a machine incorporate a durable construction and such relatively simple operating mechanism that it is not likely to get out of order or fail to operate.

An equally important object is to have such a card duplicating machine so designed with its operating parts so organized that their action is at all times instantly and fully responsive to the monitoring details of the master Jacquard card, with the result that absolute accuracy of duplication of that card on the copy card is assured.

Another very important object is to have such a card copying and duplicating machine provided with operating parts of such nature and arrangement that they are readily accessible for repairs or replacements at any time.

It is also an exceedingly important object of the invention to include in the construction of the Jacquard card duplicating apparatus a special mechanism ensemble that consists of a group of co-operating units that are distinct in location and function yet serve to produce a unitary operative result of the machine as a whole, and are also individually removable or replaceable by corresponding units of more or less different character or capacity.

It is, of course a practical object, withal, to have such a special card duplicating machine that is effective to copy and duplicate at low cost, single or double types of Jacquard cards for use upon weaving looms, knitting machines, control apparatus, automatic typewriters and the like, to bring down the cost of the use and products of such apparatus and encourage a substantial increase in the use of such card controlled apparatus generally.

Other objects and advantages of my invention will appear in further detail as the specification proceeds.

In order to facilitate ready comprehension of this invention for a proper appreciation of the salient features thereof, the invention is illustrated on the accompanying drawings forming part hereof, and in which:

Figure 3 is a vertical section of the machine as taken on the line 3—3 in Figure 1;

Figure 3a is a partial top or plan view of a group of slides and supports and some of the parts co-operating therewith, with overlying parts removed to more clearly reveal the relative position of each part actually shown;

Figure 4 is a vertical section of the machine as taken on the line 4—4 in Figure 3;

Figure 5a is a similar view showing only one punching device in operated position to illustrate co-operating between the same and a slide of the machine;

Figure 5b is also a similar view to that of Figure 5a showing the punching device in a different operated position with the slide in neutral position;

Figure 8 is also a fragmentary vertical section of the machine as taken on line 8—8 in Figure 1, showing a slide operating cam likewise fixed on the mentioned main drive shaft;

Figure 9 is a further fragmentary vertical section of the same machine as taken on line 9—9 in Figure 1, showing an intermittent card take-off drive operated by a mitre gear upon the drive shaft;

Figure 10 is a fragmentary vertical section of the rear central portion of the machine as taken on line 10—10 in Figure 2, showing the intermittent feed and take-off mechanism for the copy card made from the master card;

Figure 11 is a similar fragmentary vertical section of the upper portion of the machine as taken on line 11—11 in Figure 1, showing the master card feeding mechanism providing a loop in the master card;

Figure 12 is an operating diagram of the electrical circuit of the card duplicating machine of Figures 1 through 11;

Throughout the views, the same reference numerals indicate the same or like parts.

Figure 1:
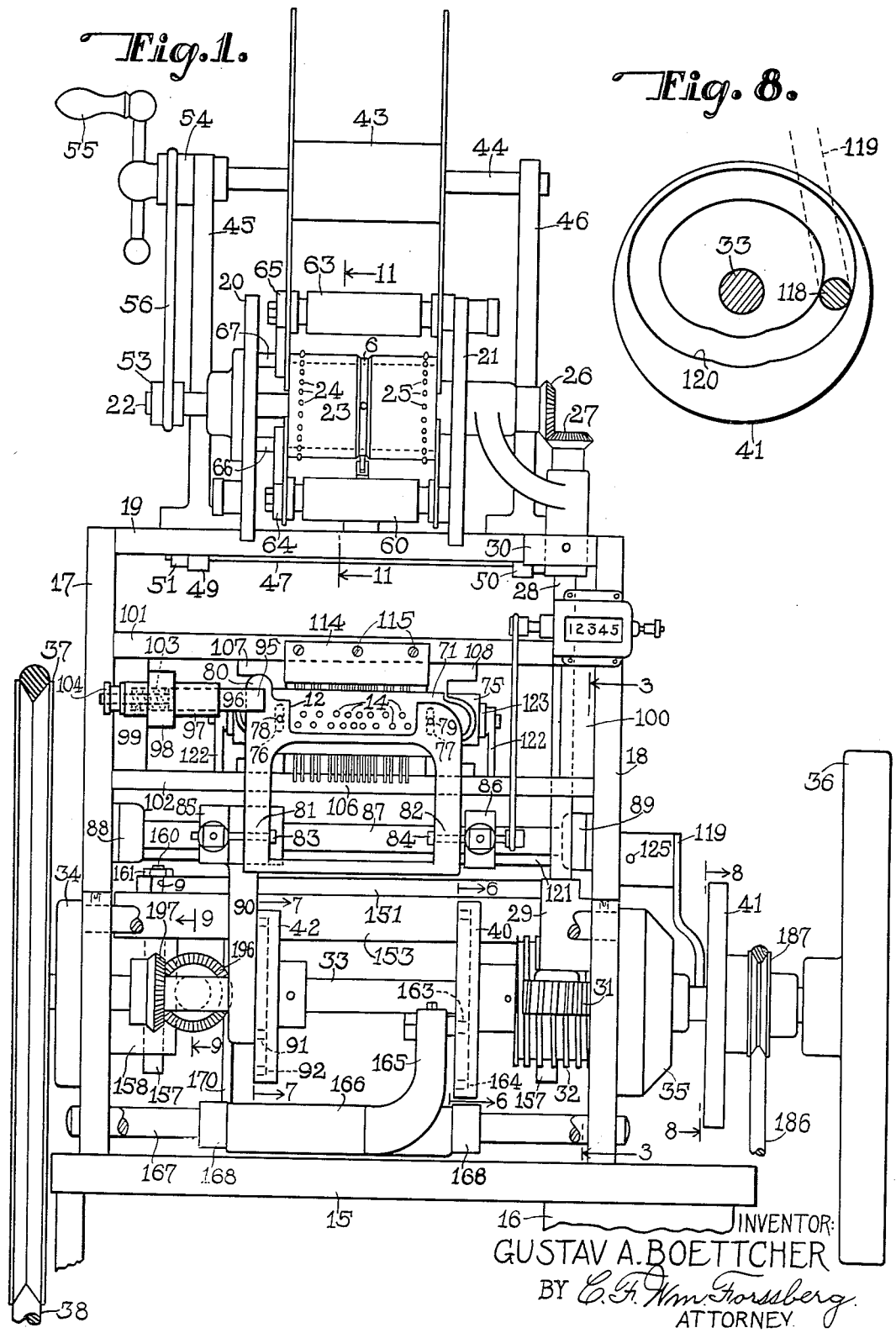
Figure 1 is a front elevation of a Jacquard card copying or duplicating machine made according to the invention and embodying the same in a practical form, the support or stand therefor, as well as the punch chip waste chute and collector being largely omitted for simplicity of disclosure.

It is quite well known that in many fields of operating mechanisms and apparatus, certain repeated patterns of operation are preferably controlled by Jacquard cards and the like perforated strips wherein perforations located in various predetermined positions define the movements to be performed by the apparatus thus controlled or operated. Frequently a master card is made for some interesting or important design or operation pattern for a textile machine such as a weaving loom, automatic embroidery machine or for an automatic typewriter or other card controlled machine of any description. It has then been desirable to copy and repeat the master card made to control the operation, as this will make it possible to use a battery of such machines turning out the same style of work, each controlled by a card like that controlling operation of the others.

However, it is ordinarily necessary to cut the perforations on some antiquated device that is not reliable but more or less inaccurate, so that in every case, the copy card or duplicate has to be carefully checked inch by inch by hand, making the production of a duplicate Jacquard card from a master card a slow and costly process. While various expedients have been tried from time to time, yet no practical apparatus for duplicating such cards accurately and speedily in mechanical manner has heretofore come to public notice or been generally adopted.

Upon considering this problem, it occurred to me that a Jacquard card duplicating machine should be positively operated by a special mechanism of novel nature and design that renders the duplicating operation virtually infallible, accurate, faithful and complete and even unavoidable in full response to the monitoring perforation upon the master card being copied. As a result, I have succeeded in producing a speedy and accurate Jacquard card duplicating machine that fully and faithfully copies all of the perforations of a master card upon a copy card with respect to arrangement and number, as will be set forth in detail in the following.

Hence, in the practice of my invention, and referring now also again to the drawings, the Jacquard card duplicating machine has a bed plate 15 supported by a stand only partly shown at 16, while a pair of upright frame members 17 and 18 are secured upon bed plate 15 in spaced apart relation. Upon the upper portions of the near side or front of these frame members is secured upper front plate or bridge member 19 surmounted by an upper pair of smaller frame members 20, 21 laterally spaced apart and provided with bearings for a Jacquard master card feed drum shaft 22 carrying a feed drum 23 having two rows of card feeding pins 24, 25. Upon one end of shaft 22 is fixed a miter gear 26 meshing with a corresponding driving mitre gear 27 fixed on the upper end of a vertical shaft 28 rotatable in bearings 29 and 30 secured upon frame member 18 and upper frame member 21, respectively. The lower end of this shaft is provided with a worm gear 31 meshing with a worm 32 fixed on a horizontal shaft 33 forming the main drive shaft of the machine rotatable in bearings 34 and 35 secured upon frame members 17 and 18. Further details of the upper mechanism associated with feed drum 23 will appear later on, but it is evident that when drive shaft 33 is rotated, worm 32 will slowly rotate worm gear 31 and with it vertical shaft 28 and its mitre gear 27, which in turn revolves feed drum 23 through mitre gear 26 and drum shaft 22.

Upon one end of drive shaft 33 is mounted a hand wheel 36 for manually rotating the drive shaft when testing or initially operating the machine before setting it going in regular manner. The other end of the same drive shaft carries a pulley 37 driven through belt 38 from a motor 39 mounted on the stand 16 and diagrammatically indicated in Figures 12 and 13. This drive shaft 33, when operated by the motor serves to drive all of the devices and mechanisms of the machine as a whole, as will be further brought out. In this connection, upon the drive shaft are fixed a series of independent cams 40, 41 and 42 spaced apart and each operating a separate follower, and each follower actuating a separate device or mechanism. While one mechanism for generally feeding the master Jacquard card has been partly referred to, its drum 23 serves mainly for providing a loop in the master card, as will be set forth. This drum is, of course not driven by a cam or follower, but by bevel gears 26 and 27, vertical shaft 28 and gears 31 and 32 directly from the drive shaft 33. For definitely feeding the master card step by step in positive manner, means are provided for receiving the master card upon the take up reel 43 on a transverse shaft 44 supported in bearings forming the upper portions of two opposite frames 45 and 46 mounted on upper bridge member 19 outside frames 20 and 21. The master card is drawn from a supply shaft 47 initially supporting the card in the form of a roll 48 as indicated in Figure 13, shaft 47 being supported in a pair of open lower rear bearings 49 and 50 on frames 45 and 46 and retained against lateral displacement by collars 51, 52.

The drum shaft 22 already referred to carries a small pulley 53, while reel shaft 44 carries a corresponding pulley 54 formed as part of the hub of an operating crank 55 on the reel shaft for manually rotating this shaft to any extent required when setting up the master card for a run through the machine. Pulleys 53 and 54 are connected by a belt 56 for frictionally rotating the reel 43 from the drum shaft during regular operation in order to take the strain off the card and form a loop as already intimated.

Figure 15:
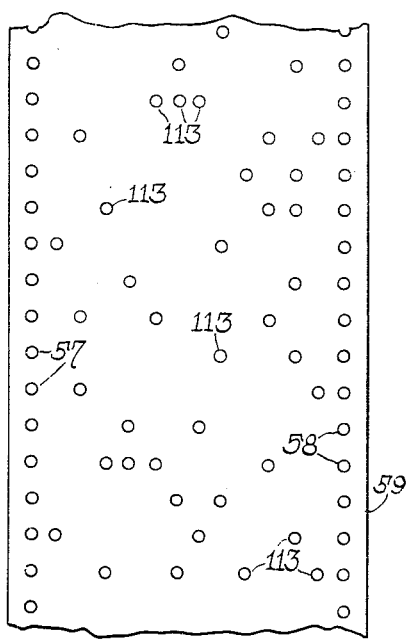
Figure 15 is a portion of a Jacquard master card or of a duplicate copy card as made by the machine therefrom.

It will be noted that as shown by the portion of the Jacquard card appearing in Figure 15, there are two marginal rows of perforations 57, 58 into which the two rows of teeth or pins 24 and 25 on drum 23 will fit. Also, as shown in Figure 11, take-up rollers 60 and 61 act to retain the card portion 59a in contact with the underside of the drum, while a second pair of rollers 62 and 63 hold card portion 59b upon the drum during passage over this drum. Yokes 64 and 65 having guide pins 66, 67 adjustable in slots 68, 69 in frame 20, for example allow adjustment of each pair of rollers to proper contact with the card portions on the drum to prevent slipping of the card and provide positive movement thereof by the drum above and beneath the latter.

Figures 13, 14:
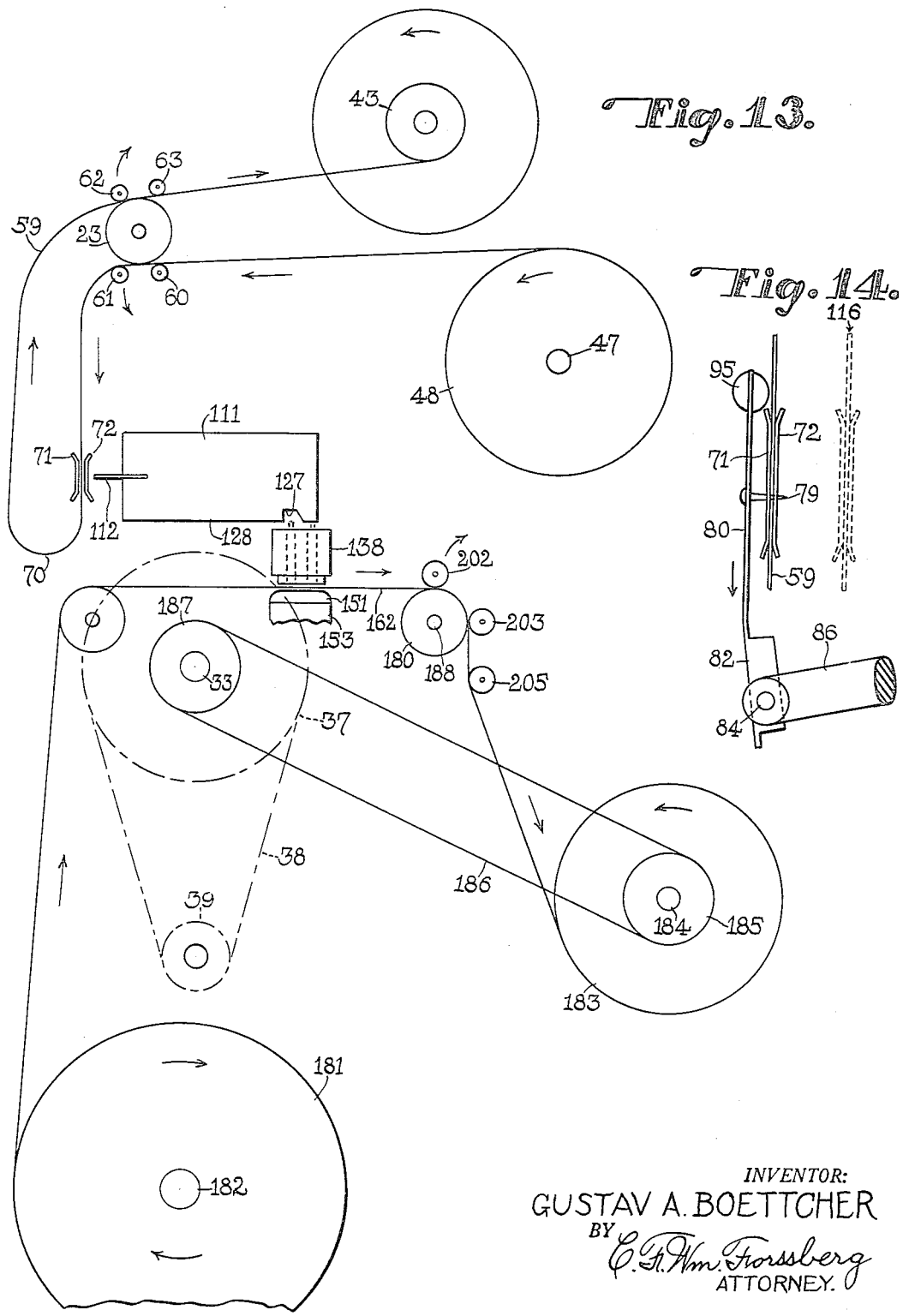
Figure 13 is a diagrammatic operation layout of the relative arrangement and paths of travel of the master Jacquard card and copy card through the machine as a whole and their mutual relations and locations upon the machine.
Figure 14 is a fragmentary side elevation of the master card feed plate and operating lever also shown in the upper left portion of Figure 3 giving another view of the master card feeding operation.

Between the upper and lower pairs of rollers just described, the card forms a depending loop 70, with its descending portion passing between a pair of substantially vertical card guide plates 71 and 72, best seen in Figures 3, 13 and 14. These plates are supported upon the front ends of a pair of horizontal slide shafts 73 and 74 which are rearwardly connected rigidly together by means of a lateral cross bar 75 movable with these shafts. Guide plates 71 and 72 have corresponding vertical clearance slots 76, 77 which register with the two rows of marginal perforations 57 and 58 on the card 59 and receive two card feeding pins 78, 79 that are fixed upon a vertically movable front card feeding plate 80. At the lower portions of this plate are fixed a pair of bearings 81, 82 laterally spaced apart and connected by two small aligned shafts 83, 84 to two parallel arms 85, 86 fixed on a cam follower shaft 87 rotatably supported in end bearings 88, 89 mounted on the inner sides of frames 17 and 18. Upon this shaft 87 is also fixed a depending follower arm 90 having a follower 91 extending operatively into cam slot 92 of cam 42 which also appears in Figure 7.

Cam 42 in its slot 92 has an upper dwell 93 and an inner or lower dwell 94 determining two positions of the follower arm and thus an upper position of feed plate 80 shown in Figure 3 and a lower position shown in Figure 14, the pins 78, 79 engaging in the marginal perforations 57 and 58 of the master card and feeding the latter downwardly step by step to loop 70, one step for each revolution of drive shaft 33 and cam 42. During such vertical movement of feeding plate 80, the upper portion thereof at one side is slidably guided normally in the slotted or bifurcated end 95 of a horizontally retractable guide member 96 slidably supported in a sleeve 97 secured upon a support 98 fixed to a space block 99 upon the inner side of frame member 17. Support 98 could be directly fixed to the frame itself, if so desired. In any event, space block 99 and a corresponding opposite space block 100 serve to space apart two horizontal cross bars 101 and 102 that form supports for a feeler or detector system about to be described.

Returning to the guide member 96, it may be noted that within sleeve 97 a compression spring 103 tends to bias this guide member into engagement with feed plate 80 in lateral direction, but allows the guide member to be withdrawn toward the left (Figure 1) by means of knob 104 sufficiently to free the guide member from feed plate 80 to allow the latter to be folded down outwardly upon shafts 83 and 84 to provide access to the master card guide plates 71 and 72 when adjusting or inserting the card between these plates. The foremost plate 71 is rigidly fixed upon the slidable shafts 73 and 74 already mentioned, but rear plate 72 forms a take-up plate resiliently biased forwardly toward plate 71 by springs 105 (one shown in Figure 3) mounted on reduced portions 106 on each slidable shaft 73 and 74. The result is that rear plate 72 normally holds master card 59 against front plate 71 with resiliently applied pressure and allows sliding movement of the card during feeding thereof by feed plate 80.

Slidable shafts 73 and 74 are slidably supported in a pair of intermediate bearing blocks 107 and 108 fore and aft between the two cross bars 101 and 102, also fore and aft, the arrangement being such that the cross bars and the bearing blocks are duplicated front and rear upon the machine, which is also true of upper bridge or cross bar 19, this construction being best seen in Figure 3, for example. Thus, these shafts with their rear plate or bar 75 and the front guide plate 71 form a movable system moving toward and receding from the front feed plate 80 for a special purpose.

Upon the underside of cross bars 101 and on the upper surface of cross bars 102 are provided corresponding series of transverse open slots or grooves 109, 110 forming guide ways for a series of movable plates or slides 111, 111 etc., located between the cross bars in virtually upright position. At the forward end of each slide is fixed a feeler or detector pin 112 adapted to enter a perforation 113, for example in card 59 when the card is moved rearwardly toward the slide involved. It should be made clear that all of the slides are wholly free to be moved rearwardly in slots 109 and 110 toward rear plate or bar 75 or forwardly toward a front stop plate 114 secured to front cross bar 101 by screws 115 without the slides being connected to any operating means. Thus, as best seen in Figure 3a, the card 59 has a number of perforations 113, 113, etc., allowing feeler pins 112 of the majority of the slides 111 to extend through the card, but at one point, the card is intact and feeler 112' of slide 111' has instead been pushed rearwardly by the card so that this slide 112' is wholly disposed in its extreme rear position independently of the other slides. The manner in which the slides are moved by the card and restored to initial forward position, as well as the purpose of such movements will now be considered, together with the step by step feeding of the master card.

Figure 7:
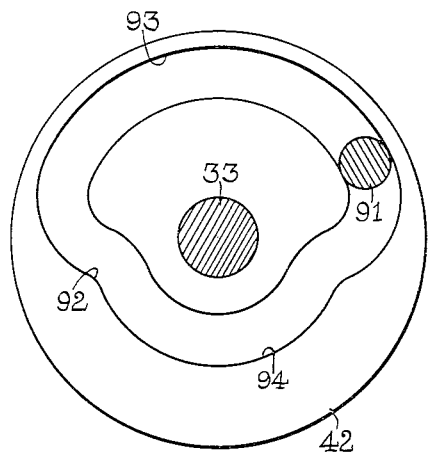
Figure 7 is another fragmentary vertical section of the same machine as taken on line 7—7 in Figure 1, showing a master card feed cam mounted on the main drive shaft of the machine.

As may be seen in Figures 3 and 14, taken with the cam and follower of Figure 7, assuming that drive shaft 33 is rotated, the cam by its slot 92 will shift follower 91 and arm 90 forwardly when the follower arrives in the outer dwell 93, whereby the arm 86 rocks upwardly about shaft 87 and, as a consequence, feed plate 80 will be raised to its highest position. In the meantime, the guide plates 71 and 72 with master card 59 between them occupy a rearward position indicated at 116 in dotted lines, the rear bar 75 also occupying a rear position indicated at 117 in dotted outline in Figure 3. The card and rear bar are shown in full lines in their rearward position in Figure 3a, wherein it is evident that the slide shifting system consisting of shafts 73 and 74, rear bar 75 and front guide plates 71 and 72 is in its rear position as a whole. Means about to be described serve to shift the system forwardly when the feed plate has attained its highest position so that pins 78 and 79 will engage in two corresponding perforations in the marginal rows 57 and 58 thru plate slots 76, 77 (Figure 1) while the card is held between the guide plates as shown in Figure 14. At this time, the cam 42 will cause the arm 86 to rock downward, bringing down front feed plate 80 and with it card 59 one step from the position of Figure 3 to that of Figure 14, after which the guide plates 71 and 72 with the master card between will recede rearwardly away from front feed plate 80.

The means for thus shifting the slide shifting system primarily includes the cam 41 on drive shaft 33 and follower 118 on lever 119, the follower engaging in cam slot 120. Follower lever or arm 119 is secured upon the outer end of a shaft 121 (Figures 1 and 3) rotatably supported by frames 17 and 18 and provided with a pair of generally upwardly directed curved arms 122, 122 pivotally connected to a pair of links 123, 123 at the forward ends thereof. These links at their rear ends are pivotally connected by pins 124 to the extremities of rear cross bar 75 to which the rear ends of slide shafts 73 and 74 are rigidly secured, as already mentioned. Upon rotation of cam 41 by drive shaft 33, the follower 118 and its lever 119 fixed by pin 125 upon shaft 121 will shift arms 122 alternately from the forward position shown in full lines in Figure 3 to that indicated in dotted lines, correspondingly shifting the slide system as a whole rearwardly.

The forward and rearward shifting of the slide system not only causes the guide plates 71 and 72 to co-operate with the vertical feeding movement of feed plate 80 but also serves a further purpose. The slides 111 all stand upon their lower edges in slots 110; upon the rear cross bar 75 being shifted forward, it positively shifts all of the slides 111 forward with it into the position shown in full lines in Figure 3 and for all expect one slide in Figure 3a. The timing of the cams 41 and 42 is such that when the bar 75 and the slide shifting system as a whole move to the rear position of Figure 3a, master card 59 is, of course shifted with it, being carried rearwardly by the guide plates to occupy the position shown, in which it is spaced rearwardly of feed plate 80. During the rearward movement of the master card, it comes into immediate and direct contact with the forward ends of the feeler or detector pins 112 of the slides wherever the card is intact, as for example at 126 in Figure 3a. The feeler 112' is pushed rearwardly by the card so that its slide 111' is thereby forced rearwardly in sliding movement to extend to cross bar 75. At a predetermined distance forwardly of the rear end of each slide, there is formed a downwardly open slot 127 in the bottom edge 128, having a rear inclined edge 129 and the opposite forward edge 130 cut at right angles to the lower edge 128. The slots 127, Figures 3, 5, 5a, 5b and 13, serve as clearances for a series of punches upon the machine, now to be described.

However, at those points upon card 59 (Figure 3a) where holes or perforations 113 exist, the feelers 112 extend through them and are simply stationary when card 59 moves rearwardly with the slide system just described, with the result that the corresponding slides 111 do not slide but remain in forward position. The ultimate result of some slide being shifted to the rear and of other slides remaining in original position will now be considered.

Figure 5:
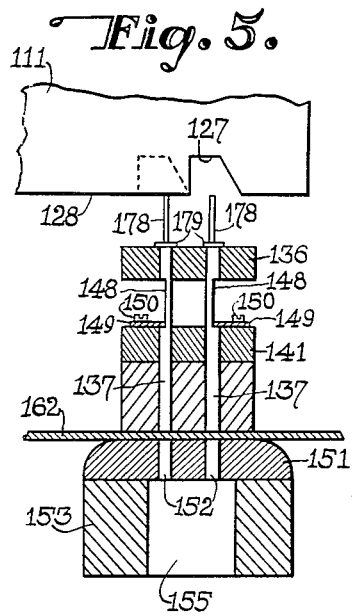
Figure 5 is a fragmentary vertical section of a portion of the machine as taken on line 5—5 in Figure 4, showing certain punching devices of the machine.

Upon the inner facing sides of frames 17 and 18 are secured a pair of opposite E-blocks 131, 131 by means of screws 132, 132, etc., having an upper narrow side slot 133 and a lower vertically larger slot 134 in each block. Into the upper smaller slots 132 extend the narrowed ends 135, 135 of a punch guide bar 136 for a plurality of vertically disposed punches 137, 137. As the narrower ends of this guide bar preferably fit tightly in slots 134 this bar is held firmly against vertical movement. Below the guide bar is located a vertically movable stripper bar or block 138 having the shallow ends 139 extending into slots 134 in such manner that the block is capable of limited movement in the slots; the punches 137 extending to the lower surface 140 (Figure 4) of this block 138. Upon the latter is located a stripper plate 141 having thin end extensions 142, 142, lying upon stripper block 138 and surrounding a pair of stripper studs 143, 143 that extend upwardly through the guide bar 136 and are provided with nuts 144, the guide bar 136 having sufficiently large apertures 145, 145 not only to let the studs 143 therethrough, but also allow free clearance for a pair of coil compression springs 146, 146 mounted upon the studs and biasing the stripper block 138 and stripper plate 141 downwardly so that ends 139 of the block rest upon the bottom ledge 147 of each E-block 131. In actual fact, there are two rows of punches, only one row being seen in Figure 4, but as indicated in Figures 3, 5 and 13, the two rows seen from one end are shown spaced but a small distance apart. The punches in one row are preferably staggered with respect to those of the other row, and the alternate slides have the bottom slots 127 correspondingly staggered with respect to those of the other slides, as best seen in Figures 3 and 5. Of course, some other arrangement may be used, the principle of the punches and their operation as controlled by the slide being the same.

In order to retain the punches in assembled relation with the guide bar 136 and the stripper block and plate while allowing a limited amount of upward movement as will be explained; upon the side of each punch 137 is cut a flat clearance slot 148 into which projects the edge of a locking plate or strip 149 secured in place on the stripper plate 141 and block 138 by screws 150, 150 adjacent each row of punches. Thus, two such strips 149 are here used, but only one is shown in Figures 5a and 5b and only one row of punches, while the stud 143 is omitted in order to clarify the view and make the operation of the punch shown obvious with respect to the slide partly shown therewith.

Below the stripper block 138 is located a vertically movable die plate 151 having a series of holes 152 registering with the lower ends of the punches in each row, this die plate resting upon a die block 153 with which the lower ends in the form of retaining heads 154, 154 engage, of the studs 143, which are slidable through stripper block 138, and retain the die plate 151 and guide block in a predetermined spaced relationship although allowing the die plate to move upwardly upon studs 143. The die plate is mounted upon a die block 153 already mentioned that has a clearance opening in the intermediate portion 155 thereof to allow punchings from the die plate holes 152 to drop therethrough. Die block 153 rests upon the flanges 156, 156 of a pair of vertical sliding studs 157, 157 guided in a pair of stationary bearings 158, 158 secured to the inner faces of machine frames 17 and 18 by screws 159, 159, etc. The upper ends of these studs are provided with threaded extremities 160, 160 upon which are fixed the nuts 161, 161 that secure the die plate upon the die block and the latter upon the flanges 156 of the studs. These latter thus form with the die plate and block a vertically movable system by the sliding of the studs in bearings 158. Normally, the copy card 162 is fed between the die plate 151 and the stripper block 138, and the perforations to be punched in this card are produced by upward movement of the die plate while certain of the punches 137 remain in position.

Figure 6:
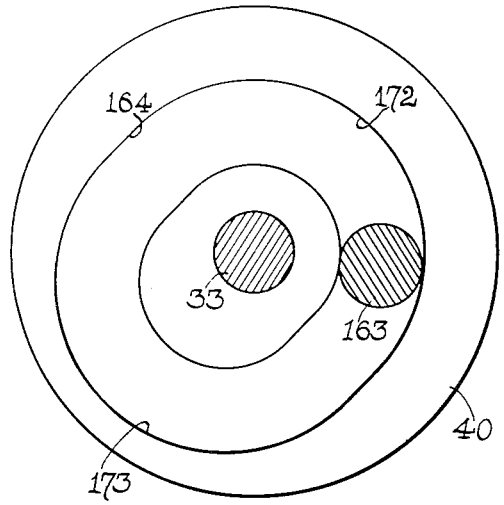
Figure 6 is a fragmentary vertical section of the machine as taken on line 6—6 in Figure 1, showing a master card feed drive cam mounted on the main drive shaft of the machine.

Before noting the co-operation between the die plate and the punches, it may be well to consider the means for operating the die plate and block. Cam 40, previously mentioned has a follower riding in its cam slot 164, the follower 163 being mounted on follower arm 165 having an elongated sleeve 166 rotatable on a stationary shaft 167 fixed between frames 17 and 18. A pair of collars 168, 168 are fixed upon shaft 167 to prevent longitudinal displacement of sleeve 166 and arm 165. Sleeve 166 has a pair of additional arms 169, 169 spaced apart and extending rearwardly at substantially right angles to follower arm 165 and at their extremities have a pair of links 170, 170 pivotally connected thereto by means of a pair of studs 171, 171 secured in these arms 169. Cam 40, also shown in Figure 6 has a low or inner portion 172 and an outer high portion 173, causing the follower 163 and thereby arm 165 to swing inwardly toward drive shaft 33 and outwardly from the same for each revolution thereof. This movement of arm 165 through sleeve 166 produces a rising and falling movement of arms 169 and links 170.

In order to communicate this movement to the die plate and block, the die block has a pair of pendent studs 174, 174 secured thereto and extending a short distance below the same. Upon these studs 174 are mounted a pair of pivot blocks 175, 175 having a pair of screws 176, 176 that engage against the sides of studs 174 at their inner ends in such fashion as to retain the studs within blocks 175. The screws 176 simultaneously serve as pivot pins for the upper ends of links 170 of arms 169, with the result that when cam 40 during rotation causes arms 169 to rise, the die block 153 and die 151 upon the same will be raised. If for any reason any punch is then prevented from being freely lifted with the die plate by copy card 162 lying on the die plate, the punch penetrates the card while the die continues upward past the lower end of the punch involved, as best seen in Figures 5a and 5b. The card first occupies the low position indicated in dotted lines at 177, and is then raised to position shown in full lines. While two punches are shown in Figure 5 to indicate the two rows of punches used in the machine, only one punch, die hole and locking plate or strip appear in Figures 5a and 5b to clarify the view and operation by omitting confusing details of members not taking part in the operation.

The part taken by the slides in controlling the effect of the punches will now be considered. Thus, as already mentioned, these slides individually have bottom rear slots 127 for a purpose that will now be disclosed. Upon the punches are upwardly extending reduced ends 178, 178 with flanges 179, 179 normally resting on guide bar 136, the height of each reduced end 178 being substantially the same as the distance between guide bar 136 and the lower edge 128 of a slide 111. The arrangement is such that when a slide is located in its extreme forward position as in Figure 3, the major number in Figure 3a as well as in Figure 5a, the bottom edge 128 of the slide overlies the upper end 178 of the punch beneath it, this slide prevents the punch from being raised by the card 162 when the die plate 151 is raised by operation of cam 40 and its follower and associated parts already described. As the raising of the die plate is positive, when the punch involved is blocked by the slide as just mentioned, the die plate carries the card upward despite this circumstance, causing the punch to perforate the card by the latter being forced up past the lower end of the punch as best seen in Figure 5a. The slide in this forward position is thus located because a corresponding perforation 113 in master card 59 has allowed the feeler 112 to pass through upon the majority of the slides as best seen in Figure 3a. Wherever a perforation exists in the master card, the feeler 112 simply passes into it without pushing the corresponding slide rearwardly, and consequently, the slide then blocks a punch when the die plate is raised during a cycle of operation, so that a corresponding perforation in the copy card 162 is produced by the punch thus blocked. In this connection it should be mentioned that for each punch there is one slide assigned thereto, and for each perforation position there is one feeler 112 on a slide registering therewith, the front guide plates 71 and 72 having corresponding holes 14 for the feelers, while the feed plate has an elongated clearance portion 12 cut out to clear all of the feelers.

When a feeler encounters the master card at a point 126 that is not perforated, the card upon being moved rearwardly by the slide shifting system will push feeler 112' and thereby slide 111' rearwardly as shown in full lines in Figures 3a, 5 and 5b into a position in which the bottom slot 127 is located above the upper reduced end 178 of the punch concerned. When the die plate 151 is raised, the punch 137 will be raised in stripper block 138, stripper plate 141 and guide bar 136 by card 162 into the elevated position shown, inasmuch as the slot forms a clearance for the punch and allows it to be raised freely without any resistance being offered. As the punch is thus easily raised into clearance slot 127, no perforation is produced in the copy card 162. The slot in each slide is thus shiftable from a forward position indicated by dotted lines 13 to the full line position in rear position of the slide. In each cycle of operation, all of the slides are pushed forward by rear cross bar 75, during each revolution of the drive shaft and the cams on the same. During each cycle, the feed plate 80 feeds the master card 59 down one step and also the guide plates 71 and 72 move the card rearwardly to detect the perforations in the card at that point, while the corresponding slides are shifted rearwardly or left stationary by the reward movement of the card, as the case may be, and the slides are shifted or allowed to remain in their forward positions accordingly. The slides will also control the effect of the punches, either to allow them to rise with the die or to block them and cause perforation of the copy card at each step. Each step of the master card represents one cycle of operation of the machine, the general feeding of this card occurring about drum 23 from supply roll 48 to take-up roll 43, already outlined, but the accurate step by step movement for the purpose of detecting the perforations is effected by the feed plate 80 and the co-operation of guide plates 71 and 72 therewith, the loop 70 (Figure 13) being maintained to avoid any strains or misoperation occurring.

Naturally, the copy card 162 should be fed in exactly corresponding step by step manner, so that for each cycle and punching operation, a step rearward is executed by the copy card between the die plate 151 and the stripper block 138 and plate 141. This copy card is thus fed by drum 180 from a card supply roll 181 on a reel 182 merely diagrammatically shown in Figure 13 and normally supported on the stand of the machine below bed 15 in a position not shown, to a take-up roll 183 on a reel 184 provided with a pulley 185 and also merely diagrammatically illustrated in Figure 13 and mounted on the machine on the level with, or below, the bed 15 in a position superfluous to illustrate. To the pulley 185 runs a belt 186 connected to a pulley 187 (Figures 1 and 2) on drive shaft 33.

The mentioned drum 180 (Figures 2, 10 and 13) is mounted on drum shaft 188 and has two rows of teeth or feeding pins 10 and 11 similar to 24 and 25 on drum 23. Shaft 188 is rotatably supported by two frame members 189, 190 secured upon and recessed into a fixed rear cross bar 191 secured between frames 17 and 18, Figure 2, and exteriorly of frame member 190 has a worm gear 192 fixed thereon. Bearing means 193 are rigidly secured to frame 17 for rotatably supporting a worm shaft 194 provided with a worm 195 meshing with worm gear 192. Worm shaft 194 extends from front to back of the machine, with worm 195 upon the rear end, while upon the forward end is fixed a mitre gear 196 meshing with a similar mitre gear 197 on drive shaft 33, as best seen in Figures 1 and 9. As also seen in the latter figure, the worm 195 is of special character, for it has a limited inclined worm section 198, while the remaining larger portion of this worm is not inclined but has its teeth disposed at right angles to the longitudinal axis of the shaft 194 so as to form a long dwell about the major portion of the circumference of this worm. In fact, the arrangement is such that only during part of each revolution of the worm is worm gear 192 partly rotated to an extent that corresponds to one step upon drum 180 of card 161.

Upon the frame members 189 and 190, are yokes 199 (Figures 2 and 10) provided with a pin or rod 200 movable in slots 201 in the frame members (one slot shown) and carrying rotatable rollers 202 and 203. Further yokes 204 are mounted within frame members 189 and 190 and rotatably supporting an additional roller 205. These rollers serve to guide the copy card over drum 180 and then down therefrom to the take-up roll 183 (Figure 13), rollers 202 and 203 holding copy card 162 upon the drum so that the step by step partial rotation imparted to this drum by the special worm 195 through shaft 194 and mitre gears 196 and 197 will provide a step by step feeding of the copy card between the die plate and the stripper block already described.

From the foregoing, it is evident that for each revolution of the drive shaft 33, the master card 59 will be fed downward one step both by drum 23 and also by feed plate 80, while the slide system also goes through a forward and then a rearward movement, pushing one or more slides rearwardly by card 59 in guide plates 71 and 72, after which the die plate and die block are raised once to punch perforations corresponding to those detected by the feelers on the slides. Simultaneously, the copy card is fed rearwardly a step between the die plate and stripper block and the punches are caused to act once to produce perforations corresponding exactly to those detected by the slide feelers. When one step or cycle has been completed, another cycle follows, and so on in continuous operation until the entire master card 59 is accurately and rapidly copied in every detail upon the copy card 162.

Figure 2:
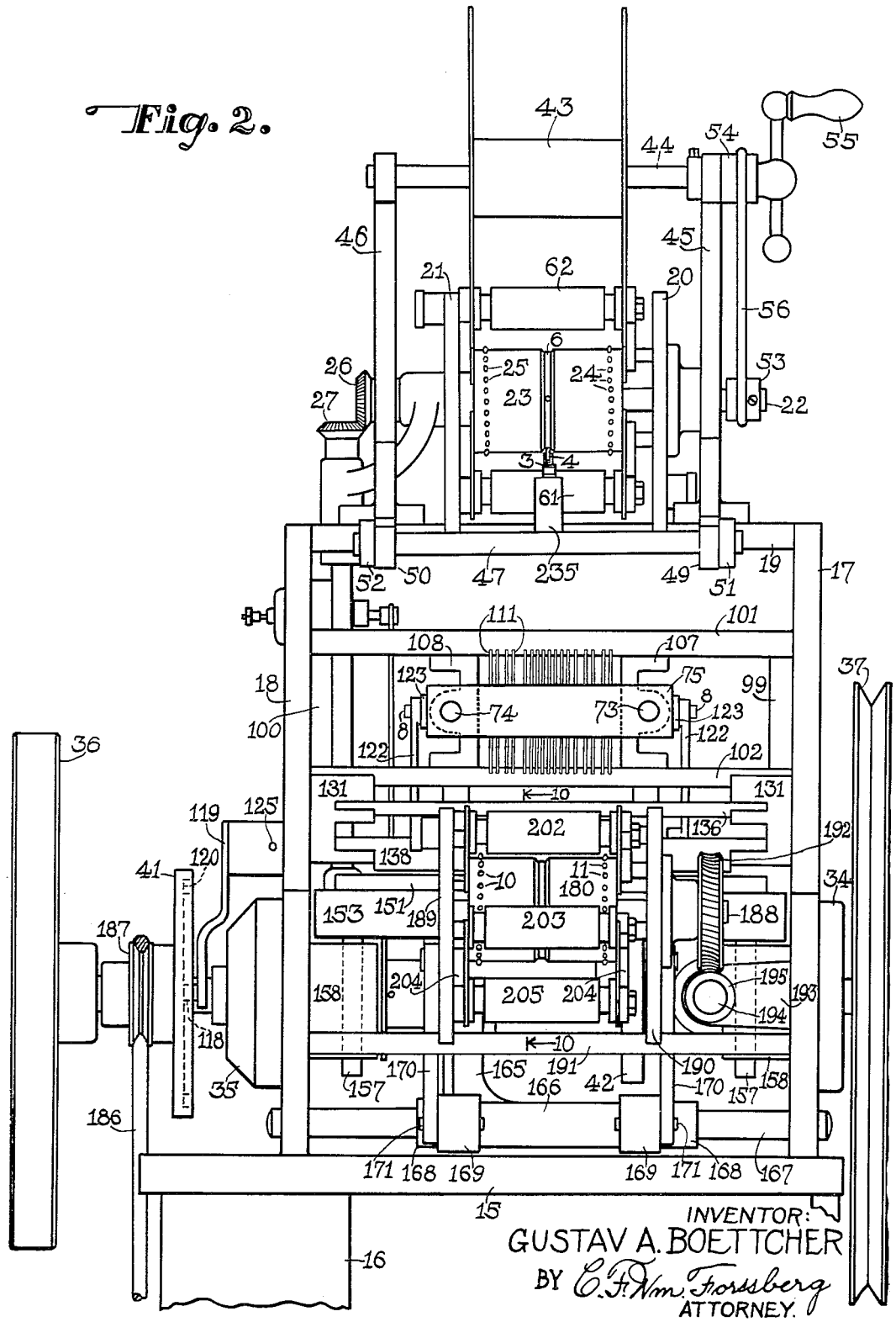
Figure 2 is a rear elevation of the same machine as seen from the opposite direction than in Figure 1.

As may be seen in Figures 1, 2 and 12, the machine has an automatic stop for cutting out operation as soon as the master card has reached the end and is entirely copied. The master card drum 23 has a central slot 6 which is normally covered by the card being fed from supply roll 48 to take-up reel 43, while a roller 4 rotatable on the end of a contact lever 3 pivoted at 5 rides on the card out of contact with the drum. A spring 1 urges the roller 4 resiliently into contact with the card on the roller, while the remote end of the lever is located upon a contact 2 mating with another contact 7, and is grounded to the machine, but normally out of contact with said other contact 7. When the card terminates, roller 4 shifts into groove 6, and due to its depth, this groove allows considerable movement of the roller and lever 3 upon fulcrum 5, thus bringing contact 2 down upon contact 7. The result of this meeting of the contacts will immediately be explained.

A transformer 206 is connected to the power mains 207 and 208, while the driving motor 39 is directly connected to one main 208 by conductor 209. Another conductor 210 connects the other main 207 to a stationary contact 211, above which is mounted a movable contact 212 capable of being moved down into effective contact with contact member 211 by a movable switch member 213 normally urged upwardly away from contact 211 by a spring 215. One lead from the transformer is grounded at 216, while the other lead 217 branches off to two solenoids 218 and 219. Switch member 213 has a magnetically responsive portion 220 disposed adjacent to solenoid 218 so that when the latter is energized by current from the transformer, it will draw member 220 downward, and with it contact 212 to contact 211, which closes the circuit of motor 39 through conductor 221. However, in order to energize the solenoids, the mentioned contact 7 is connected by a conductor 222 to solenoid 219 and to a stop switch contact 223 through conductor 224, the other contact 225 of the switch being connected to ground on the machine through conductor 226. Switch member 227 serves to close the circuit between contacts 223 and 225, energizing solenoid 219 and thereby drawing the switch locking member toward the solenoid away from switch member 213. This allows spring 215 to take effect and raise member 213 and thereby separate contacts 211 and 212, breaking the motor circuit and thus stopping the machine. As contact 2 is also grounded, termination of the card off drum 23 will allow lever 3 to swing upwardly with roller 4 into the groove 6 in the drum as indicated in dotted lines, with the result that contact 2 is brought into effective contact with contact member 7, pulling locking member 228 away from the lower locking portion 229 of switch member 213 against the bias of spring 230 and thus allowing spring 215 to raise this switch member and separate contacts 211 and 212, thereby stopping the motor by breaking its circuit by ending of the card on the drum 23.

From solenoid 218 extends a conductor 231 to a starting switch contact 232, another contact 233 of this switch being connected by conductor 226 to ground and switch member 234 serves to interconnect contacts 232 and 233 at will to close the motor circuit by drawing switch member 213 down to solenoid 218 and bring lower locking portion 229 down beneath the lower end of locking member 228, when the spring 230 immediately pushes member 228 away from solenoid 219 out over locking end 229, holding member 213 in lowered position in which contact 212 is in effective contact with contact member 211 beneath. The motor circuit is thus locked in closed condition, but actuation of solenoid 219 either by roller 4 entering groove 6 on drum 23 upon the card having ended, or upon closure of stop switch 227 with contacts 223 and 225, will energize solenoid 219 and draw locking member 228 away from engagement with locking portion 229 of switch member 213. This releases this member and opens contacts 211, 212.

It is evident, therefore, that the machine may be started by manually closing the starting switch and stopped by operating the stop switch, or automatically stopped by operation of the lever 3 and its roller moving into drum groove 6 upon the end of the master card having been reached. Casing 235 on bar 19 may cover the switches.

The machine thus described includes in its ensemble several units, such as the master card feeding unit, the slide system as a unit, the copy card feeding unit, the punch and die unit, etc., each unit being separately removable from the machine and replaceable by another unit that is new or of different capacity. For example, the master card take-up and supply and loop feed unit with frames 45 and 46, as well as smaller frames 20 and 21 recessed into the upper surfaces of bridge members or bars 19, with reel 43, reel shaft 47, drum 23 and its rollers 60 to 63 may be removed from the top of the machine without disturbing the main portions thereof below bridge members 19. Then, again, the copy card feeding unit including frame members 189, 190, drum 180, rollers 202, 203 and 205 supported on rear bar 191 may be removed therefrom even when the worm 195 and its shaft and mitre gear 196 supported in bearing 193 temporarily remain, after which this bearing and the worm shaft may be removed from the frame 17.

Then again, the slide system including the side bearings 107, 108, slides 111, parallel shafts 73 and 74 with their rear cross bar 75 and front feed plate 80 and guide plates 71 and 72 may be removed after releasing stud or screw 8, 8 from links 122, 122 by releasing screws 236, 236 that hold blocks 99 and 100 to the inner opposite faces of frames 17 and 18, the cross bars 101 and 102 being directly secured to these spacing blocks so that release of the latter serves to release the entire slide system.

It is equally true of the die and punch unit that the same may be removed or replaced in similar fashion, for by releasing nuts 161, 161 from the upper threaded ends 160, 160 of studs 157, 157, extending up through forwardly open slots 9 in the die, die 151, stripper plate 138, stripper bar 141 and guide plate 136 with the punches 137, 137, etc., will be free to be withdrawn rearwardly from the machine as a unit held in association by studs 143, 143.

It is thus self evident that in the machine embodying my invention, the various units may be removed for repairs or replacement without disturbing other units, and that this contributes great convenience in assembling or repairing the machine or altering it for a different capacity of operation, as for wider or different forms of Jacquard cards. To this may be added the novel features of the manner in which the perforations in the master card are detected and recorded and then transferred to the punches to produce corresponding perforations in the copy card, as well as the manner in which the master card and the copy card are fed step by step individually in successive cycles.

It may be noted that while I have described the upper cross bars 19, 101 and 102, as well as the side bearings 107 and 108 as being repeated fore and aft upon the machine, the principles of construction and relations of the parts are the same if a single wide bridge member or cross bar replaces any one or each of the cross bars 19, 101 and 102, and single long side bearings the mentioned side bearings 107 and 108. Likewise, the pivot blocks 175 could be secured directly to the underside of die block 153 by machine screws instead of being removable pendent from studs 174, if desired. In any event, when the die unit is removed as a coherent unit, the supporting E-blocks remain in place on the machine, which is also true of the die block just mentioned, which remains upon the studs 157 slidably mounted in the stationary upright side bearings 158, 158.

Manifestly, variations may be resorted to, and parts and features may be modified or used without others within the scope of the appended claims.

Having now fully described my invention, I claim:

1. A Jacquard card duplicating machine including a frame structure having a driven shaft and bearings for supporting the same, a plurality of individually movable punches, a stationary guide bar fixed on the frame structure transversely of the copy card and having a series of holes for guiding the punches and normally retaining them in initial operative position, a movable punch die disposed adjacent to the ends of the punches on one side of the guide bar with die apertures registering with said punches, guide means upon the frame structure for said punch die, means driven from said shaft for moving said die during operation, horizontal guide means fixed upon the frame structure for supporting a group of slides, a plurality of punch control slides slidably mounted upon said horizontal guide means and at one end of each carrying a perforation feeler, each punch control slide having both effective and ineffective portions capable of registering with the punches, means for moving the master card against the feelers including a pair of closely associated guide plates, a pair of bearings fixed upon the machine upon both sides of the punch control slides, a pair of substantially parallel shafts extending through the latter bearings and secured at one end of each to the outer of said guide plates, the other being loosely mounted and having a pair of springs urging the same toward the other plate in order to retain the master card therebetween, means operated from the driven shaft for feeding the master card downward step by step between said guide plates, a rear cross bar fixed to the other ends of said pair of shafts, a cam on the driven shaft, a further shaft supported upon the frame structure having a follower arm mounted thereon with a follower engaging with said cam, a pair of further arms fixed on the follower arm and rockable therewith upon said further shaft, a pair of links pivotally connected at one end of each to said cross bar and the other ends being pivotally connected to said further arms, and means also driven from said driven shaft for additionally and independently feeding said master card and maintaining a loop therein.

2. A Jacquard card duplicating machine according to claim 1, wherein the means for feeding the master card step by step includes a vertically movable feeding plate having at least one feeding projection extending toward the slides, stationary guide means for the feeding plate disposing it in front of the guide plates, a lever rockably mounted on the frame structure, means upon the driven shaft for rocking the lever by engaging with one end thereof, the other end of the lever being operably connected to the feeding plate, the one or more feeding projections on the feeding plate engaging in feeding apertures in the master card during downward movement of said plate when said lever rocks in one direction, and wherein the means for additionally feeding and maintaining a loop in the master card includes a card feeding drum rotatably supported upon the machine, a worm on the driven shaft, a further shaft rotatably supported upon one frame portion at substantially right angles to the driven shaft and having a worm gear on the same meshing with said worm and a bevel gear on another portion thereof, a corresponding bevel gear on the drum meshing with the bevel gear on said further shaft, and supply and take-up reels on said machine for the master card.

3. A Jacquard card duplicating machine according to claim 2, wherein the guide bar and punches and punch die have a pair of guide members extending slidably thru the guide bar and punch die so as to form one removable unit and the slides, horizontal guide means mounted upon the frame structure and parallel bearings and shafts with the rear cross bar thereon and the guide plates form a second removable unit.

4. In a Jacquard card duplicating machine for copying a master card upon a copy card, said machine including a pair of machine frames spaced apart, means securing the frames into a rigid unit, bearings on the frames and a driven shaft rotatably supported in said bearings, the combination of a stationary guide bar mounted between the frames having a series of holes therein; a series of punches mounted in the holes in said guide bar; a movable punch die disposed beneath the ends of the punches below said guide bar; a pair of guide means upon the frames for said punch die; a pair of projecting members on said die slidably engaging with said guide means, a cam fixed on the driven shaft; a follower engaging with the cam and having a follow arm connected thereto, a support upon the frames for movably supporting said follow arm; at least one further arm rigidly connected to said follow arm and rockable therewith; a link pivotally interconnecting each further arm with the punch die; step by step card feeding means operated from the driven shaft for feeding the master card past a predetermined zone upon the machine; said card feeding means including a pair of guide plates having a pair of clearance portions spaced apart thereon and a plurality of feeler holes located in the area between said clearance portions; a pair of substantially parallel shafts secured at one end of each to one of said guide plates and supporting the other plate, resilient means urging the other plate toward the one plate secured to the two shafts; a pair of bearings spaced apart and fixedly mounted on the machine for guiding said pair of shafts; a pair of cross bars spaced apart for directly supporting said bearings and having a plurality of transverse slots in the mutually facing surfaces; a plurality of slides movably guided in the transverse slots in said cross bars and having elongated feelers fixed upon the ends thereof directed toward said guide plates; a movable cross bar fixed upon and interconnecting the other ends of said pair of shafts beyond said slides; a second cam upon the driven shaft having a follower engaging therewith, a follower arm carrying the last mentioned follower and rockably mounted upon the machine; a pair of additional arms rigid with the follower arm; a pair of links interconnecting the additional arms and the ends of said movable cross bar; the clearance portions on the guide plates being adapted to register in succession with marginal feeding perforations on the master card; a substantially vertically movable master feed plate having a pair of feeding pins spaced apart and adapted to project into the clearance portions of the guide plates, the latter being movable with said pair of shafts toward and away from said feed plate; a guide member mounted on one portion of the machine for guiding the feed plate in movement; a third cam fixed upon the driven shaft also having a follower engaging therewith; a third follower arm carrying the last mentioned follower; a support upon said machine for said third follower arm; at least one further arm secured rigidly to the third follower arm; a link connected pivotally to said further arm and to said master card feed plate; the feelers upon the slides registering with the feeler holes in the guide plates and the slides being located above the punches individually in effective position normally to prevent the punches from being raised with the punch die during operation and feeding means operated from the driven shaft for feeding a copy card between the guide plate and the punch die in step by step movement, there being a copy card supply reel and a copy card take-up reel upon said machine.

5. A Jacquard card duplicating machine according to claim 4, wherein the feeding means for the copy card includes a feeding drum rotatably mounted upon a portion of the machine, a worm gear rigidly rotatable with the drum, a shaft rotatably supported between the frames and having a gear meshing with a corresponding driving feed gear mounted upon another portion of the main or driving shaft, rollers mounted in close association with said drum for retaining the card in contact therewith, and an intermittently operating step worm on the first mentioned shaft meshing with the worm gear of said drum.

6. A Jacquard card duplicating machine according to claim 5, wherein the machine includes an auxiliary card feeding drum rotatably supported upon a portion thereof for feeding the master card and maintaining a loop thereon following the step by step feeding means therefor, rollers closely associated with the last mentioned drum for maintaining the master card in contact with said drum for positive feeding thereof; a substantially upright feed shaft rotatably mounted on a side portion of the machine and having gears upon the ends thereof, a gear upon the drive shaft meshing with one of said gears and another gear rigidly associated with said drum meshing with the other gear on said shaft; a stripper bar resiliently mounted above the punch die for receiving the copy card between the die and said stripper bar, means limiting movement of said stripper bar with respect to said die and guiding the same in vertical movement, the punches normally extending down through said stripper bar; supply and take-up reels for the master card; and means upon the machine for limiting forward movement of the slides under impulse of the movable cross bar interconnecting the pair of shafts bearing the guide plates, including a depending plate fixed upon the machine in the path of said slides.

7. A Jacquard card duplicating machine according to claim 6, wherein the master card auxiliary feeding drum and rollers and the supply and take-up reel for the card surmount the machine above the slides and the movable cross bar and guide plates with their parallel shafts, and the drive shaft and cams are disposed on the lower level of the machine below said shafts, cross bar and slides, and wherein the step by step feeding drum for the copy card with its rollers is located upon the machine substantially at the same general level with the slides and rear cross bar and guide plates but just far enough below that level to allow of free access to the slides and guide plates above said copy card feeding drum, the copy card supply and take-up reels being disposed below the level of the drive shaft of the machine.

8. In a Jacquard card duplicating machine including a frame structure with bearings for a driven shaft and a driven shaft mounted therein, the combination of a plurality of substantially horizontal slides having perforation feelers individually fixed upon one end of each, a slide guiding and supporting box structure removably mounted upon the frame structure and removable with the slides as a unit therefrom, slide shifting means driven from the shaft for pushing the slides as a group in the directions of the feelers, a vertically movable card feeding member movably supported forwardly of the feelers and having at least one projection directed toward said slides for engaging in perforations in a master card, operating means including a lever shiftable upon rotation of said shaft to move said card feeding member up and down, vertically disposed card gripping and guiding plates movable between the card feeding member and the ends of the slides bearing the feelers and having slot means forming clearances for the projection or projections on said card feeding member, said feeding member with the card guiding plates and lever forming a second unit independently removable from the frame structure, a substantially horizontal bar having vertical guide apertures for supporting a group of punches, a plurality of punches pendently mounted in the apertures of said bar, a stripper bar having similar apertures spaced a short distance below the first mentioned bar and freely movable in limited vertical direction, a die located below the stripper bar and having apertures registering with the punches, guide members extending vertically through the die, stripper bar and first mentioned bar, vertical guide means for said die allowing the latter to move vertically in operation, a pair of slotted support blocks fixed upon the frame structure and having portions of the ends of the bars extending into the slots in said blocks and allowing the bars with the punches and die to be removed as an independent unit from the machine, the slides having effective and ineffective portions co-operating with the upper ends of the punches to prevent them from moving with the die or allowing them to move therewith during operation, as the slides are disposed with respect to the feelers and perforate and imperforate portions of the master card are fed past the feeding member between the two guide plates, means driven from said shaft for raising and lowering the die in operative movement, and further card feeding mechanism mounted upon the frame structure effective to feed a copy card between the stripper bar and the die past the punches and removably secured upon said frame structure so as to be independently removable therefrom as a copy card feeding unit, there being means driven from said shaft for operating said copy card feeding mechanism.

References Cited in the file of this patent
UNITED STATES PATENTS

| | | |
|---|---|---|
| 153,025 | Upson | July 14, 1874 |
| 303,681 | Sutleffe | Aug. 19, 1884 |
| 825,303 | Darlington | July 10, 1906 |
| 1,021,049 | Kelly | Mar. 26, 1912 |
| 1,732,982 | Neville | Oct. 22, 1929 |
| 2,062,298 | Eitzen | Dec. 1, 1936 |
| 2,078,800 | Juchter | Apr. 27, 1937 |
| 2,179,517 | Pelosi | Nov. 14, 1939 |
| 2,180,058 | Jones | Nov. 14, 1939 |
| 2,552,942 | Dalle | May 15, 1951 |
| 2,599,213 | Velghe | June 3, 1952 |